(12) United States Patent
Lee

(10) Patent No.: US 7,057,669 B2
(45) Date of Patent: Jun. 6, 2006

(54) LANGUAGE DISPLAYING APPARATUS FOR DIGITAL TV AND METHOD FOR THE SAME

(75) Inventor: Hwal Rim Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 476 days.

(21) Appl. No.: 09/971,613

(22) Filed: Oct. 9, 2001

(65) Prior Publication Data

US 2002/0044222 A1 Apr. 18, 2002

(30) Foreign Application Priority Data

Oct. 14, 2000 (KR) ............................... 2000-60576

(51) Int. Cl.
H04N 5/445 (2006.01)
H04N 7/08 (2006.01)

(52) U.S. Cl. ............ 348/563; 348/462; 348/569; 348/567; 348/484; 348/461; 725/40

(58) Field of Classification Search ............... 348/564, 348/569, 563, 567, 460, 461, 462, 469, 473, 348/474, 484, 738; 704/260, 270, 201, 203; 725/40, 39
See application file for complete search history.

(56) References Cited

U.S. PATENT DOCUMENTS

| | | | | |
|---|---|---|---|---|
| 5,844,478 A | * | 12/1998 | Blatter et al. | 348/474 |
| 5,966,637 A | * | 10/1999 | Kanungo et al. | 725/132 |
| 5,982,448 A | * | 11/1999 | Reyes | 348/552 |
| 6,166,780 A | * | 12/2000 | Bray | 348/632 |
| 6,243,676 B1 | * | 6/2001 | Witteman | 704/243 |
| 6,249,320 B1 | * | 6/2001 | Schneidewend et al. | 348/569 |
| 6,380,984 B1 | * | 4/2002 | Inoue et al. | 348/569 |
| 6,438,140 B1 | * | 8/2002 | Jungers et al. | 370/471 |
| 6,473,129 B1 | * | 10/2002 | Choi | 348/465 |
| 6,507,369 B1 | * | 1/2003 | Kim | 348/465 |
| 6,529,526 B1 | * | 3/2003 | Schneidewend | 370/486 |

* cited by examiner

*Primary Examiner*—John Miller
*Assistant Examiner*—Jean W. Désir
(74) *Attorney, Agent, or Firm*—Birch, Stewart, Kolasch & Birch, LLP

(57) ABSTRACT

A language displaying apparatus for a digital TV and a method for the same notices all kinds of languages included in broadcasting signals and enables a user to recognize them and select the preferable language easily and accurately. To achieve this, the method according to the present invention comprises the steps of abstracting and storing all kinds of languages included in broadcasting signals, displaying the stored kinds of languages or outputting in the form of an audio and outputting the audio signals corresponding to the language selected by the user among the kinds of languages.

22 Claims, 4 Drawing Sheets

FIG.2
CONVENTIONAL ART

| Syntax | Bits | Format |
|---|---|---|
| Service_location_descriptor(){ | | |
|     descriptor_tag | 8 | 0xA1 |
|     descriptor_length | 8 | uimsbf |
|     reserved | 3 | '111' |
|     PCR_PID | 13 | uimsbf |
|     number_elements | 3 | uimsbf |
|     for(i=0;<number_elements;i++){ | | |
|         stream_type | 8 | uimsbf |
|         reserved | 3 | '111' |
|         elementary_PID | 13 | uimsbf |
|         ISO_639_language_code | 8*3 | uimsbf |
|     } | | |
| } | | |

# LANGUAGE DISPLAYING APPARATUS FOR DIGITAL TV AND METHOD FOR THE SAME

BACKGROUND OF THE INVENTION

1. Field of the Invention

The present invention relates to a language displaying apparatus for a digital TV and method for the same and particularly, to a language displaying apparatus for a digital TV and method for the same capable of displaying language information contained in broadcasting signal.

2. Description of the Background Art

Generally, digital broadcasting is transmitting a transport stream which is a digital signal to which a video, audio, data and broadcasting information is timely multiplexed. The detail about the transport stream is disclosed in 'International Standard Organization (ISO)/International Electrotechnical Commission (IEC) No. 13818'.

The data included in the transport stream can include a conversational mode broadcasting data, program downloading data, software program and the like.

On the other hand, the broadcasting information includes a tuning frequency needed for broadcasting reception, a packet identifier (PID) for distinguishing packets of video/audio data signals and broadcasting schedule information. Here, the broadcasting information adopts slightly different standards for respective broadcasting methods.

At present, technology of the digital TV is being actively developed and accordingly, it is capable of conducting a test broadcasting or main broadcasting for the digital TV. For example, in case of transmitting the broadcasting program through a satellite, the main bandwidth is allotted to the broadcasting program and control information and the residual bandwidth can be utilized as an additional information channel for related information of the broadcasted program. Particularly, there is a service possible with the present art and it is the Electronic Program Guide (EPG) which enables TV audiences to watch information broadcasted at various channels more efficiently.

FIG. 1 is a block diagram showing an apparatus for regenerating a general digital broadcasting signal.

As shown in FIG. 1, the apparatus comprises a tuner 1 for receiving the digital broadcasting signal, converting the signal into the form of transport stream and outputting; a channel decoding unit 2 for adjusting errors by decoding the transport stream; a demultiplexer 3 for abstracting the audio, video and additional data included in the transport stream outputted from the channel decoding unit 2; decoding unit 4 for outputting the audio and video signals by decoding the data abstracted from the demultiplexer 3 and a Video Display Processor (VDP) 5 for converting the video signal into an appropriate output format. Here, the transport stream is composed of packets having a certain bites and respective packets have their own Ids to distinguish what kind of information (audio, video channel and the like) the packets have. Surely, the transport stream includes Program and System Information Protocol (PSIP) as well as audio and video packets so that information about respective channel programs can be known. Namely, the packetized audio and video information can be shown only in case of having the PSIP.

The PSIP information comprises a Master Guide Table (MGT), Terrestrial Virtual Channel Table (TVCT), Rating Region Table (RRT), Event Information Table (EIT), Extended Text Table (ETT), System Time Table (STT) and the like. Here, a broadcasting guide is outputting decoded information of a Packet Identifier (PID) which is included in the PSIP information, starting time, broadcasting time, program rating, image kind, voice multiplex and respective receiver manufacturers display the broadcasting guide screen in various forms by decoding the broadcasting guide information transmitted from a transmitting station. At this time, the broadcasting guide information can be known by the Service Location Descriptor (SLD) among descriptors of the EIT.

FIG. 2 is a view showing a syntax of Service Location Descriptor (SLD).

As shown in FIG. 2, 'number elements' corresponds to the number of audio and videos and by the lower loops, the stream type whether the element is audio or video, elementary PID what the packet ID is and IDO__639_language code what the language is, if it is audio should be known.

Generally, since a video can include a number of audio in the transport stream of the digital TV, a user can select his or her preferable language among a number of audio and listen to it. Here, the language can be languages of many countries for multiplexing and can be comprised of many forms distinguishing the audiences of the program in one language of a country.

Therefore, conventionally, after the user selects a language among several languages set as a default (for example, Korean, English, Japanese and French), if the language is included in the transport stream, the language is outputted and if the selected language is not included, the first language in the service location descriptor. Namely, the language is outputted not by searching and displaying the language actually included in the transport stream. Several languages generally listened are displayed as defaults and when the user selects one, it is searched whether the selected language is included in the transport stream. If there is, the language is outputted and if there is not, the first language in the order set in the service location descriptor is outputted.

However, the conventional digital TV has a disadvantage that the user can not know all kinds of languages included in the transport stream.

Also, the conventional digital TV also has a disadvantage that the user can not listen to the language in case the language is not included in the user menu as a default, for example, German.

Also, the conventional digital TV also has a disadvantage that the user listens only to the first language in the order set in the service location descriptor not displaying a number of languages above in case a language is allotted to many languages.

SUMMARY OF THE INVENTION

Therefore, an object of the present invention is to provide a language displaying apparatus for a digital TV and a method for the same for enabling a user to select languages which the user wants to recognize and listen to accurately by abstracting all kinds of languages included in returned signals and displaying the kinds of languages in the form of OSD or outputting in the form of audio.

To achieve these and other advantages and in accordance with the purpose of the present invention, as embodied and broadly described herein, there is provided a method for a language displaying apparatus comprising the steps of abstracting and storing all kinds of languages included in the broadcasting signal, displaying the stored kinds of languages and outputting the audio signal corresponding to the selected language by the user among the kinds of languages.

There is also provided a digital TV language display comprising a language kind abstraction unit for abstracting the kinds of languages contained in the broadcasting signal, a microcomputer for outputting a control signal by searching languages which he or she wants from the abstracted kinds of languages according to the user's request signal and a A/V decoder for outputting the kinds of the abstracted languages and outputting the kinds of languages in the form of audio.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification; illustrate embodiments of the invention and together with the description serve to explain the principles of the invention.

In the drawings:

FIG. 2 is a view showing a syntax of Service Location Descriptor (SLD);

DETAILED DESCRIPTION OF THE PREFERRED EMBODIMENTS

Reference will now be made in detail to the preferred embodiments of the present invention, examples of which are illustrated in the accompanying drawings.

Hereinafter, a language displaying apparatus for a digital TV and a method for the same which abstract all kinds of languages included in the broadcasting signal and outputs the abstracted kinds of languages in the form of the OSD or audio thus to enable the user to recognize it and select the preferable language accurately is described in detail with reference to FIGS. 3 and 4.

Figure 1:
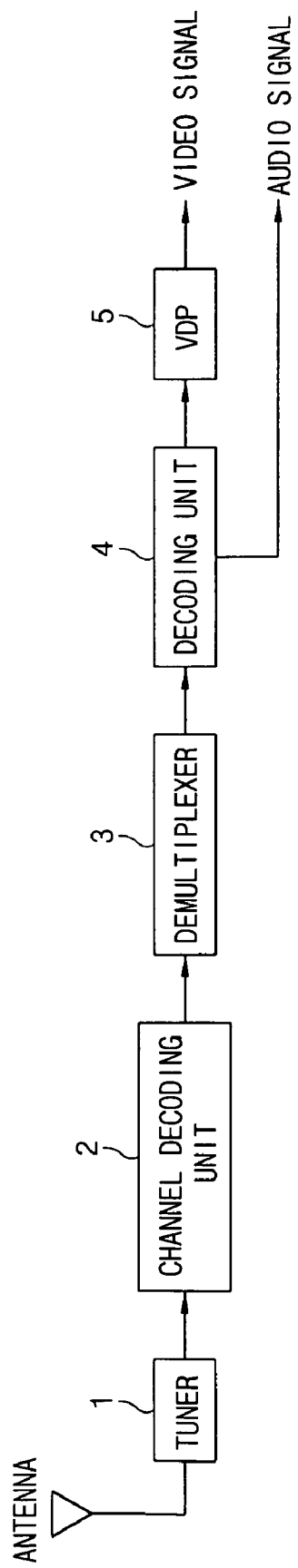
FIG. 1 is a block diagram showing an apparatus for regenerating a general digital broadcasting signal.
Figure 3:
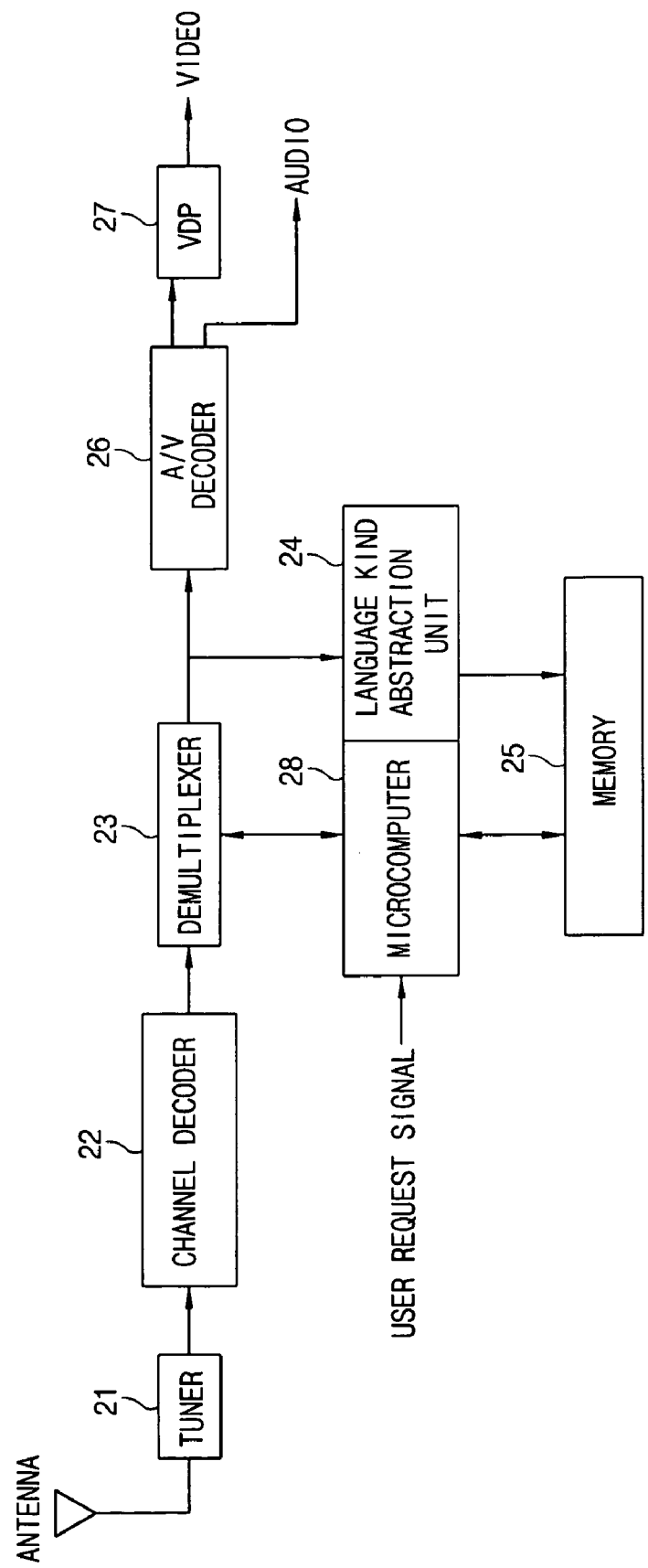
FIG. 3 is a block diagram showing a language displaying apparatus for a digital TV in accordance with the present invention.

FIG. 3 is a block diagram showing a language displaying apparatus for a digital TV in accordance with the present invention.

The language displaying apparatus for a digital TV comprises a tuner 21 for receiving the digital broadcasting signal, converting the signal into the form of a transport stream and outputting; a channel decoder 22 for adjusting errors by decoding the transport stream; a demultiplexer 23 for abstracting the audio, video and additional data included in the transport stream outputted from the channel decoder 22; a language kind abstraction unit 24 for abstracting all kinds of languages included in the transport stream; a memory 25 for storing information corresponding to the kinds of the abstracted languages; a A/V decoder 26 for outputting the audio and video signals by decoding the data abstracted from the demultiplexer 23, outputting the kinds of languages abstracted from the language kind abstraction unit 24 and outputting the kinds of languages in the form of an audio, a Video Display Processor (VDP) 27 for converting the video signal into an appropriate output format and a microcomputer 28 for controlling the A/V decoder 26 so that the audio signal of the researched language is outputted when the user researches the preferable language. Hereinafter, the operation of the language displaying apparatus for the digital TV will be described in detail with reference to FIG. 4.

Figure 4:
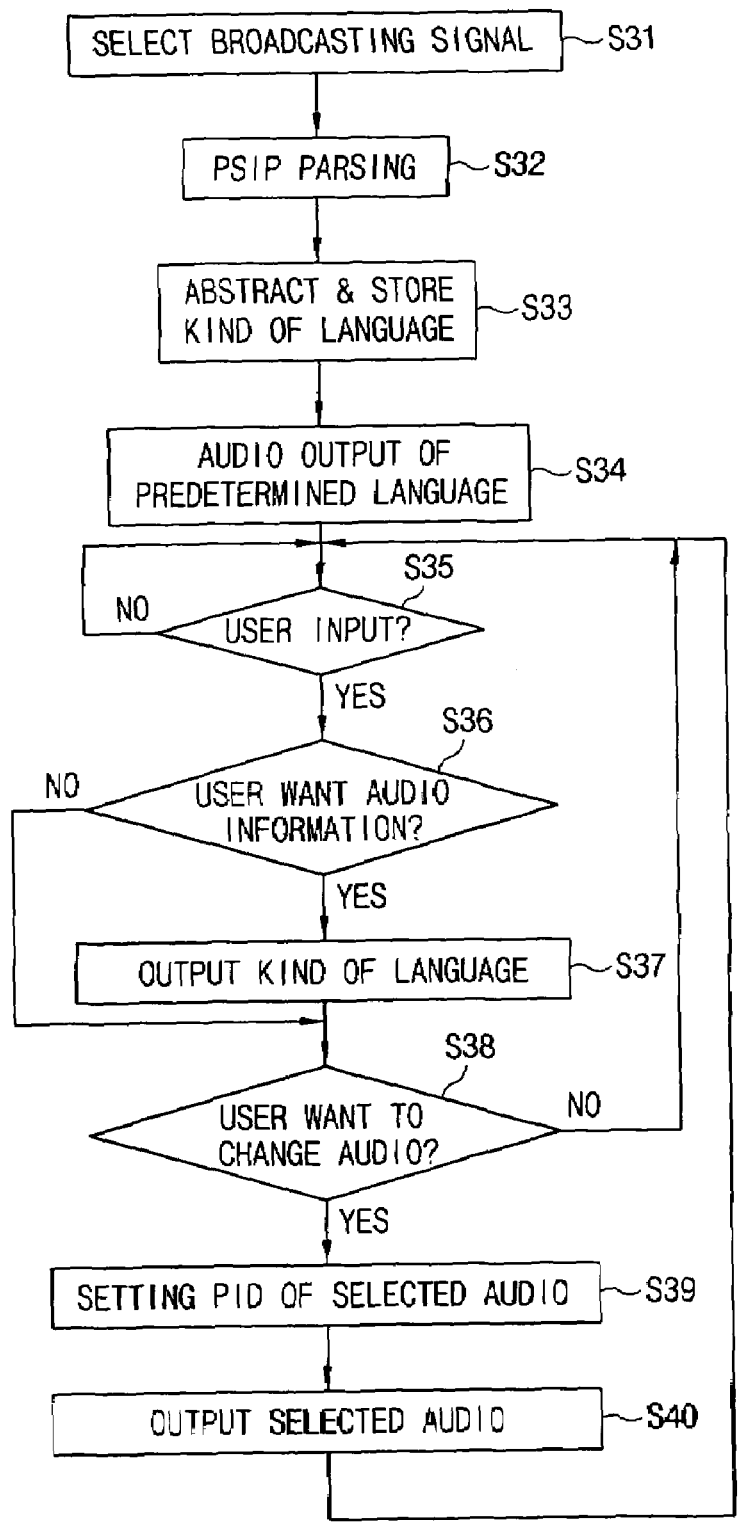
FIG. 4 is a flow chart showing a language displaying method for the digital TV in accordance with the present invention.

FIG. 4 is a flow chart showing a language displaying method for the digital TV in accordance with the present invention.

Firstly, when a user turns on the TV the tuner 21 selects the broadcasting signal of the channel selected by the user among the broadcasting signals of the respective received through an antenna (S31). Here, the tuner 21 converts the broadcasting signals of the selected channel into the form of the transport stream and outputs them.

The channel decoder 22 adjusts errors by decoding the transport stream and outputs to the demultiplexer 23.

The demultiplexer 23 abstracts the audio, video, additional data and the like included in the transport stream outputted from the channel decoder 22. At this time, by parsing the Program and System Information Protocol (PSIP) from the transport stream (S32), the language kind abstraction unit 24 abstracts the kinds of languages and stores them in the memory 25 (S33).

Later, the A/V decoder 26 outputs the video signals corresponding to the channel selected by the user by decoding the signals to the VDP 27. At this time, the VDP 27 converts the decoded video signals outputted from the A/V decoder 26 in the appropriate format and outputs them. Also, the A/V decoder 26 outputs the audio signals corresponding to the pre-selected language (S34). Here, the channel the user selects means the channel which the user has already used or the user selected at the same time of turning-on of the TV. Also, the pre-selected language means the language which the corresponding broadcasting company set as a default or the user set using the setting function of the TV.

On the other hand, the microcomputer 28 judges whether there is a user request signal for changing language set beforehand to another language inputted (S35). Namely, the microcomputer 28 judges there is the user request signal generated when the user pushes a menu setting button (not shown) in the remote control or in the TV directly to convert the audio corresponding to the language selected by the user into another language while the user is listening.

The microcomputer 28 judges whether the user wants the information of the kinds of the stored languages, if the user request signal is inputted (S36) and if the user wants the stored language, selects the language setting menu. Namely, if the language setting menu is selected by the user, the microcomputer 28 outputs the information stored in the memory 25 so that the user can recognize easily (S37). Namely, the present invention does not display the language list set as a default in the language setting menu as the conventionally but all kinds of languages stored in the memory 25 are outputted so that the user watches the kinds of languages included in the broadcasting signals and listens to the preferable language.

On the other hand, the microcomputer 28 judges whether the user wants to convert the language into the preset language in case the user does not want the information of all kinds of languages or displays all kinds on the TV screen (S38). Here, the preferable language of the user is selected from the information stored in the memory 25.

The microcomputer 28 sets the Packet Identifier (PID) (S39) if the user selects a language among all kinds of the selected languages and outputs a control signal into the A/V decoder 26. At this time, the A/V decoder 26 outputs the audio signals corresponding to the language selected according to the control signal (S40).

Here, the microcomputer 28 displays the abstracted kinds of languages from the language kind abstraction unit 24 in the form of On Screen Display (OSD) on the digital TV (not shown). If the user selects the preferable language among all kinds of the displayed languages, the microcomputer 28 outputs the control signal to the A/V decoder 26. At this time, the A/V decoder 26 outputs the audio signal of the language selected by the user according to the control signal.

Also, the microcomputer 28 has the user listen to the kinds of the abstracted languages in the audio outputting method at a certain time (several seconds~several tens seconds) intervals so that the user can select the preferable language by pushing selecting buttons. Namely, the present invention can have users with sight defect listen to the audio corresponding to the preferable language easily.

Also, the microcomputer 28 displays the kinds of the abstracted languages in the form of the OSD by combining the described OSD method and the audio method and if the user selects the displayed corresponding language at the same time, the microcomputer 28 outputs the audio signals which are matched with the language thus the user can recognize the kind of language easily.

Here, the kinds of language displayed in the form of the OSD and the audio outputted according to the audio outputting method can be outputted only with the language the audience uses and outputted in the forms of letters or voice of the corresponding language. For example, in case the audience is a Korean and the language to be selected is English, the language can be displayed as 'Korean' or 'English' in the form of the OSD and according to the audio outputting method, the audio signal is outputted as 'Korean' or 'English'.

Therefore, by the language displaying apparatus and the method, the user can recognize the language to be used through the sense of sight and hearing and the user can determine the preferable language finally.

As described above, the language displaying apparatus for the digital TV and the method for the same in accordance with the present invention have an advantage that the user can recognize all kinds of languages included in the broadcasting signals and the user can select the preferable language easily and accurately by abstracting all kinds of languages included in the broadcasting signals, displaying the kinds in the form of the OSD or outputting them in the form of an audio.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A language displaying method for a digital TV comprising the steps of:
  receiving a transport stream including audio signals in a plurality of languages;
  abstracting all kinds of said languages included in the transport stream;
  storing abstracts of said kinds of languages; and
  displaying the abstracted kinds in the form of OSD (On Screen Display) and outputs in the form of an audio signal so that abstracts of the kinds of languages are heard.

2. The method of claim 1, wherein the all kinds of languages are abstracted by parsing Program and System Information Protocol (PSIP) included in the transport stream.

3. The method of claim 1, wherein the audio signal is outputted by setting Packet Identifier (PD) of a selected language by a user among the selected kinds of languages.

4. The method of claim 1, wherein the kinds of languages are displayed in the form of the OSD so that the user can recognize the kinds of languages.

5. The method of claim 1, further comprising the step of:
  displaying the kinds of languages in the form of OSD and at the same time, in the form of voice.

6. A language displaying method for a digital TV, comprising the steps of:
  receiving a broadcasting signal including audio signals in a plurality of languages;
  abstracting and storing abstracts of all kinds of said languages included in the broadcasting signal;
  displaying the stored kinds of languages; and
  outputting an audio signal corresponding to the selected language by a user among the kinds of languages so that abstracts of the kinds of languages are heard.

7. The method of claim 6, wherein the all kinds of languages are abstracted by parsing Program and System Information Protocol (PSIP) information included in the broadcasting signal.

8. The method of claim 6, wherein the audio signal is outputted by setting a Packet Identifier (PID) of the language selected by the user.

9. The method of claim 6, wherein the kinds of languages are displayed in the form of an OSD (On Screen Display) so that the user can recognize the kinds of languages.

10. The method of claim 6, further comprising the step of:
  outputting the kinds of languages in the form of voice.

11. The method of claim 6, further comprising the step of:
  displaying the kinds of languages in the form of the OSD and at the same time, in the form of voice.

12. A language displaying method for a digital TV, comprising the steps of:
  receiving a transport stream including audio signals in a plurality of languages;
  abstracting and storing abstracts of kinds of said languages by parsing Program and System Information Protocol (PSIP) information included in the transport stream;
  outputting the stored kinds of languages so that a user can recognize when he or she selects a language selection menu; and
  outputting an audio signal corresponding to the selected language by setting a Packet Identifier (PD) of the selected language if the user selects the language to listen among the above kinds of languages so that abstracts of the kinds of languages are heard.

13. The method of claim 12, wherein the kinds of languages are displayed in the form of an OSD (On Screen Display).

14. The method of claim 12, wherein the kinds of languages are outputted in the form of voice.

15. The method of claim 12, wherein the kinds of languages are displayed with the OSD method and at the same time, outputted in the form of voice.

16. A language displaying apparatus for a digital TV, comprising:

a receiver for a broadcasting signal including audio signals in a plurality of languages;

a language kind abstraction unit for abstracting the kinds of said languages contained in the broadcasting signal;

a microcomputer for outputting a control signal by user's searching for a preferable language among the abstracts of kinds of the abstracted languages according to a user request signal; and a A/V decoder for outputting the kinds of languages abstracted according to the control signal and an audio signal of the language selected by the user so that abstracts of the kinds of languages are heard.

17. The apparatus of claim 16, further comprising a memory for storing the kinds of the abstracted language.

18. The apparatus of claim 16, wherein the language kind abstraction unit abstracts the above kinds of languages by parsing Program and System Information Protocol (PSIP) information contained in the broadcasting signal.

19. The apparatus of claim 16, wherein the microcomputer displays the kinds of languages with an OSD (On Screen Display) method.

20. The apparatus of claim 16, wherein the microcomputer outputs the kinds of languages in the form of voice.

21. The apparatus of claim 16, wherein the microcomputer displays the kinds of languages in the form of the OSD and at the same time, in the form of voice.

22. A language displaying apparatus for a digital TV, comprising:

a receiver for a broadcasting signal including audio signals in a plurality of languages;

a language kind abstraction unit for abstracting the kinds of said languages by parsing Program and System Information Protocol (PSIP) information contained in the broadcasting signal;

a memory for storing abstracts of the kinds of the abstracted languages;

a A/V decoder for outputting the abstracted kinds of languages and outputting the kinds of languages in the form of audio so that abstracts of the kinds of languages are heard; and a microcomputer for controlling the decoding unit so that when the user researches the preferable language the audio signal of the researched language is outputted.

* * * * *